(12) United States Patent
Johnson et al.

(10) Patent No.: US 7,304,816 B2
(45) Date of Patent: Dec. 4, 2007

(54) DISC DRIVE FAILURE PREDICTION

(75) Inventors: Cary Dean Johnson, Savage, MN (US); Gary Gang Jing, Shakopee, MN (US); Matthew Edward Hastings, Bloomington, MN (US); Todd Phillip Fracek, Shakopee, MN (US); Paul William Burnett, Savage, MN (US); Feng Li, Victoria, MN (US); Wei-Hua Lin, Plymouth, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 171 days.

(21) Appl. No.: 11/153,155

(22) Filed: Jun. 15, 2005

(65) Prior Publication Data

US 2005/0246591 A1 Nov. 3, 2005

Related U.S. Application Data

(63) Continuation-in-part of application No. 10/354,768, filed on Jan. 30, 2003, now Pat. No. 6,982,842.

(60) Provisional application No. 60/410,983, filed on Sep. 16, 2002.

(51) Int. Cl.
*G11B 27/36* (2006.01)
(52) U.S. Cl. .................................................. 360/31
(58) Field of Classification Search ............... None
See application file for complete search history.

(56) References Cited

U.S. PATENT DOCUMENTS 5,612,845 A * 3/1997 Smith ....................... 360/137
5,661,615 A 8/1997 Waugh et al. ................. 360/75
5,699,510 A 12/1997 Petersen et al. ......... 395/185.07
5,727,144 A 3/1998 Brady et al. ............ 395/182.04
5,828,583 A 10/1998 Bush et al. ............. 364/551.01
5,832,199 A 11/1998 Apperley et al. ....... 395/182.04
5,841,260 A 11/1998 Imai ........................... 318/638
5,889,784 A 3/1999 Rogers ........................ 371/5.1
5,917,724 A 6/1999 Brousseau et al. .......... 364/186
5,991,707 A 11/1999 Searles et al. .............. 702/185
6,205,409 B1 3/2001 Zvonar ....................... 702/183
6,249,887 B1 6/2001 Gray et al. .................... 714/47

(Continued)

OTHER PUBLICATIONS

Bayesian approaches to failure prediction for disk drives, Department of Computer Science and Engineering, University of CA, Greg Hamerly and Charles Elkan, 8 pages, 1995-2000.

(Continued)

*Primary Examiner*—Andrea Wellington
*Assistant Examiner*—Dan I Davidson
(74) *Attorney, Agent, or Firm*—Westman, Champlin & Kelly, P.A.

(57) ABSTRACT

In a method for predicting failure of a disc drive during operation of the disc drive, a write fault count is maintained that corresponds to write faults encountered during write operations to a disc of the disc drive. Additionally, a frequency domain representation of a position error signal of a head of the disc drive is obtained. Finally, failure of the disc drive is predicted based on the write fault count and the frequency domain representation of the position error signal. Another aspect of the present invention relates to a disc drive that is capable of performing the above-described method.

20 Claims, 5 Drawing Sheets

U.S. PATENT DOCUMENTS

| | | |
|---|---|---|
| 6,249,890 B1 | 6/2001 | Ukani et al. .................. 714/721 |
| 6,292,912 B1 | 9/2001 | Cloke et al. .................. 714/718 |
| 6,295,577 B1 | 9/2001 | Anderson et al. ............ 711/113 |
| 6,317,850 B1 | 11/2001 | Rothberg ..................... 714/704 |
| 6,359,433 B1 | 3/2002 | Gillis et al. .................. 324/210 |
| 6,415,189 B1 | 7/2002 | Hajji ............................ 700/79 |
| 6,460,151 B1 | 10/2002 | Warwick et al. ............. 714/718 |
| 6,467,054 B1 * | 10/2002 | Lenny .......................... 714/42 |
| 6,600,614 B2 | 7/2003 | Lenny et al. ................. 360/31 |
| 6,636,817 B2 | 10/2003 | Fioravanti .................... 702/75 |
| 6,674,589 B2 * | 1/2004 | Min et al. ..................... 360/31 |
| 7,072,274 B2 * | 7/2006 | Smith et al. ............. 369/247.1 |
| 2003/0112538 A1 | 6/2003 | Smith .......................... 360/31 |
| 2004/0051988 A1 | 3/2004 | Jing et al. ..................... 360/31 |

OTHER PUBLICATIONS

Improved Disk-Drive Failure Warnings, IEEE Transactions on Reliability, vol. 51, No. 3, Sep. 2002.

* cited by examiner

DISC DRIVE FAILURE PREDICTION

CROSS-REFERENCE TO RELATED APPLICATION

This application is a continuation in part of U.S. application Ser. No. 10/354,768, filed on Jan. 30, 2003 now U.S. Pat. No. 6,982,842, for inventors Gary Gang Jing, Scott Douglas Ulrich, Timothy Edward Langlais and Yi Q. Lin, and entitled "PREDICTIVE DISC DRIVE FAILURE METHODOLOGY", which in turn claims priority from U.S. Provisional Application No. 60/410,983, filed on Sep. 16, 2002, for inventors Gary Gang Jing, Scott Douglas Ulrich, Timothy Edward Langlais and Yi Q. Lin, and entitled "MULTI-VARIATE PREDICTIVE FAILURE METHODOLOGY FOR DISC DRIVES," the content of which is hereby incorporated by reference in its entirety.

FIELD OF THE INVENTION

The present invention generally relates to disc drive data storage systems and, more particularly, but not by limitation, to disc drive failure prediction based upon a write fault count and a frequency domain representation of a position error signal of a head of the disc drive.

BACKGROUND OF THE INVENTION

Disc drives are used as primary data storage devices in modem computer systems and networks. While very reliable, today's disc drives occasionally fail. In addition to causing computer system downtime, such disc drive failures can result in the loss of some or all of the data stored in the disc drive. Accordingly, disc drives commonly perform Predictive Failure Analysis (PFA) using Self-Monitoring Analysis and Reporting Technology (SMART), to predict disc drive failure caused by the gradual decay of electrical and/or mechanical components of the disc drive. The primary goal of PFA is to predict when disc drive failure is imminent to allow the data stored in the disc drive to be saved.

PFA is generally performed during the operation of the disc drive by monitoring key disc drive attributes that are indicative of the health of the disc drive. Additionally, PFA can be implemented by performing periodic self-diagnostic tests on the disc drive. Present methods of performing PFA in disc drives predict imminent disc drive failure based upon errors associated with a single attribute (e.g., read errors, write errors, seek errors, fly-height errors, etc.). In these methods, errors corresponding to the single attribute are monitored and compared to a threshold value. When the errors exceed the threshold, a warning of imminent disc drive failure is provided to the user.

It is critical that the PFA method utilized in the disc drive be sensitive enough to detect imminent disc drive failure. However, it is also important that the method not be overly sensitive to false indications of imminent disc drive failure. In other words, while it is important to correctly identify disc drives that are about to fail, it is also equally important to avoid falsely predicting an imminent failure when the disc drive is functioning properly.

For example, disc drives include a spindle motor that rotates one or more discs. Over time, bearings of the spindle motor contained in raceways wear and eventually produce a vibration or mechanical resonance during the rotation of the discs that can result in disc drive errors such as data writing errors or write faults, which can lead single attribute PFA methods to prematurely predict disc drive failure even though the disc drive is not approaching imminent failure.

Embodiments of the present invention provide solutions to these and other problems, and offer other advantages over the prior art.

SUMMARY OF THE INVENTION

One aspect of the present invention is directed to a method for predicting failure of a disc drive during operation of the disc drive that provides accurate predictions of imminent disc drive failure while reducing the likelihood of false disc drive failure predictions. In the method, a write fault count is maintained that corresponds to write faults encountered during write operations to a disc of the disc drive. Additionally, a frequency domain representation of a position error signal of a head of the disc drive is obtained. Finally, failure of the disc drive is predicted based on the write fault count and the frequency domain representation of the position error signal.

Another aspect of the present invention relates to a disc drive that is capable of performing the above-described method. The disc drive includes a microprocessor, a memory accessible by the microprocessor and including a write fault count, and a failure analysis module. The failure analysis module includes instructions executable by the microprocessor to perform steps of maintaining the write fault count corresponding to write faults encountered during write operations to a disc, obtaining a frequency domain representation of a position error signal of a head of the disc drive, and predicting failure of the disc drive based on the write fault count and the frequency domain representation of the position error signal.

Other features and benefits that characterize embodiments of the present invention will be apparent upon reading the following detailed description and review of the associated drawings.

DETAILED DESCRIPTION OF ILLUSTRATIVE EMBODIMENTS

The present invention generally relates to a method of predicting failure of a disc drive during operation of the disc drive and a disc drive configured to implement the method. More particularly, the predictive failure analysis (PFA) method of the present invention targets disc drives having spindle motors, or other mechanical components, that are near failure.

Over time, mechanical components of disc drives, such as spindle motors, actuators (e.g., rotary actuators), suspensions, and other mechanical components, wear down. Such wearing of the mechanical components is often made evident by mechanical resonances that are generated by the mechanical component as a result of the wear. Accordingly, a condition of the mechanical component can be determined based on such mechanical resonances. As will be explained in greater detail below, the present invention bases a disc drive failure prediction, in part, on such mechanical resonances. Although it is understood by those skilled in the art that this aspect of the present invention is applicable to various mechanical components of the disc drive, the exemplary embodiments described below will focus on predicting failure of a disc drive, in part, on the monitoring of resonant frequencies corresponding to a failing spindle motor, in order to simplify the discussion of the invention.

As mentioned above, the spindle motor of the disc drive rotates one or more discs. Over time, bearings of the spindle motor contained in raceways wear and eventually produce a vibration or mechanical resonance during the rotation of the discs that can result in disc drive errors such as data writing errors or write faults. Although the existence of write faults, or a high rate of write faults, can be indicative of an imminent disc drive failure, it has been found that relying solely on the existence of such a single disc drive attribute results in a high percentage of false disc drive failure predictions. The method of the present invention reduces false disc drive failure predictions by basing a disc drive failure prediction on at least two attributes in combination. These attributes include a write fault count and a frequency domain representation of a position error signal (PES) of a head of the disc drive, both of which relate to disc drive failure caused by spindle motor degradation.

Figure 1:
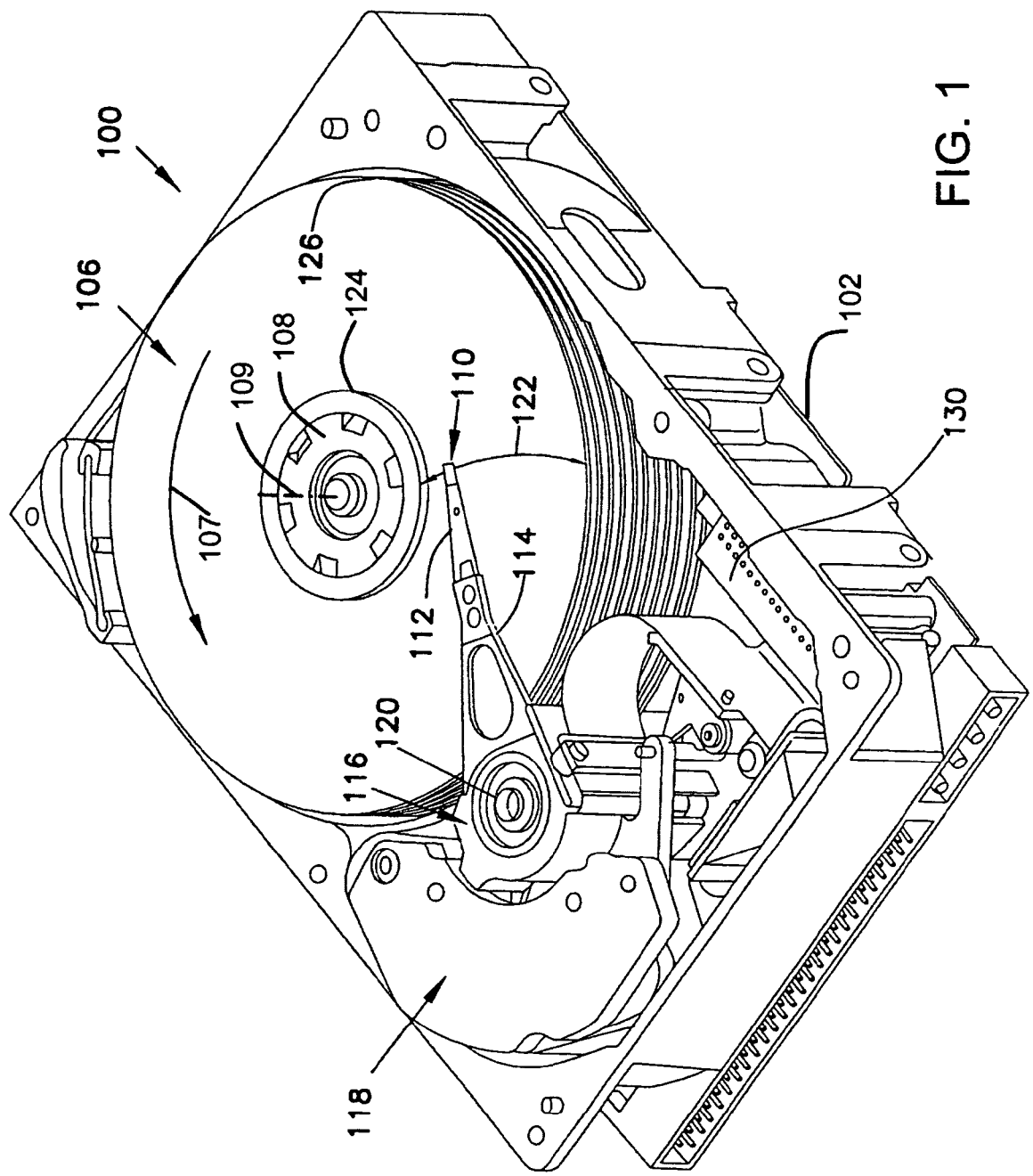
FIG. 1 is an isometric view of a disc drive.

FIG. 1 is an isometric view of a disc drive 100 in which embodiments of the present invention are useful. The disc drive 100 includes a housing with a base 102 and a top cover (not shown). The disc drive 100 further includes a disc pack 106, which is mounted on a spindle motor (not shown) by a disc clamp 108. The disc pack 106 includes a plurality of individual discs, which are mounted for co-rotation about a central axis 109, as indicated by arrow 107. Each disc surface has an associated disc head slider 110 which is mounted to the disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. The voice coil motor 118 rotates the actuator 116 with its attached heads 110 about a pivot shaft 120 to position the heads 110 over a desired data track along an arcuate path 122 between a disc inner diameter 124 and a disc outer diameter 126. The voice coil motor 118 is driven by servo electronics 130 based on signals generated by the heads 110 and a host computer (not shown).

A servo control system or loop provides control of the position of one of the heads 110 relative to servo tracks of one of the discs to control track seeking and track following operations. During a track following operation, the head 110 is caused to follow a corresponding selected data track on the disc 106. The servo information from the track being followed is periodically sampled and provided to a servo controller, which controls the actuator mechanisms used to control the position of head 110 in order to maintain the head 110 in a desired relationship to the data track.

Figure 2:
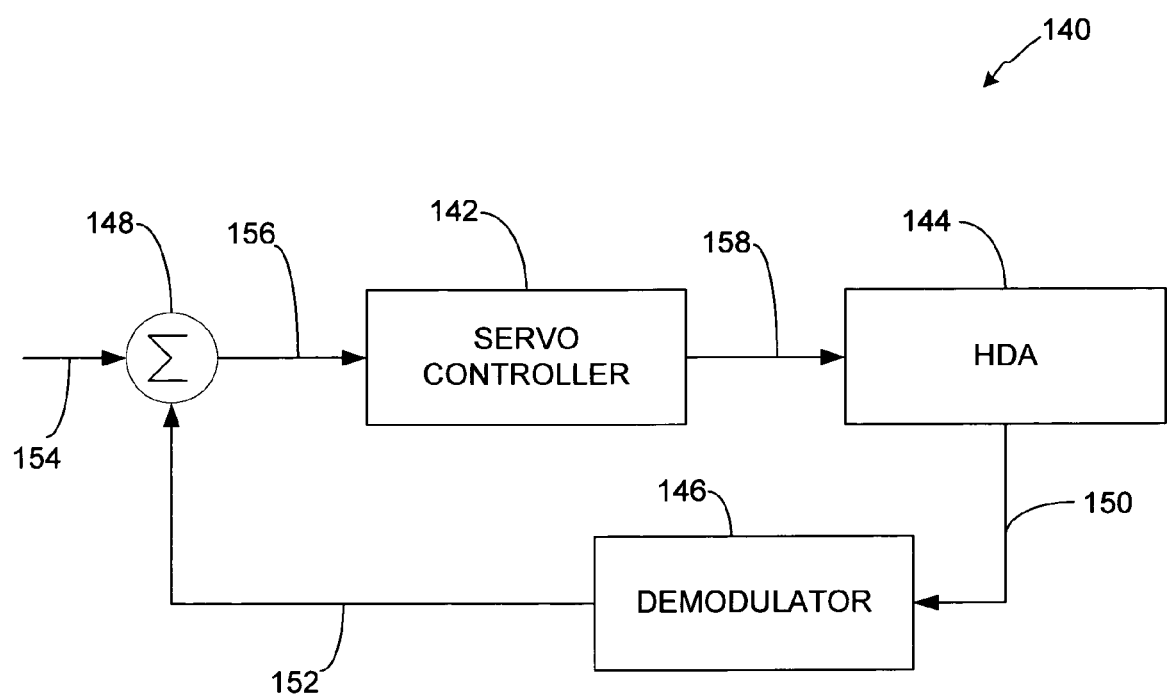
FIG. 2 is a block diagram of a servo control system for use in a disc drive.

FIG. 2 is a simplified block diagram of a servo control system 140 which could be used with the disc drive 100 to control the position of the heads 110 relative to the discs 106. The servo control system 140 includes a servo controller 142, a head/disc assembly (HDA) or "plant" 144, a demodulator 146, and a summing junction 148. The HDA 144 generally includes the actuator mechanisms of the disc drive 100, such as the voice coil motor, as shown in FIG. 1. As the discs 106 are rotated, one of the heads 110 of the HDA 144 periodically sample servo information contained in the servo sectors of the associated disc and produces an output signal 150 in response thereto. The servo information contained in the output signal 150 is demodulated by the demodulator 146 and is presented as a head position signal 152. The head position signal 152 is provided as an input to the summing junction 148, which also receives a reference signal 154 relating to a desired position (i.e., track number) of the head 110. The summing junction 148 compares the reference signal 154 to the head position signal 152 and produces a position error signal (PES) 156. The PES 156 relates to a correction in the position of the head 110 is required to position the head 110 in accordance with the desired location indicated by the reference signal 154. The PES 156 is provided to the servo controller 156, which responds by adjusting a control signal 158 that is provided to the HDA 144. The control signal 158 causes the actuator mechanisms of the HDA 144 to adjust the position of the head 110 toward the desired location.

Figure 3:
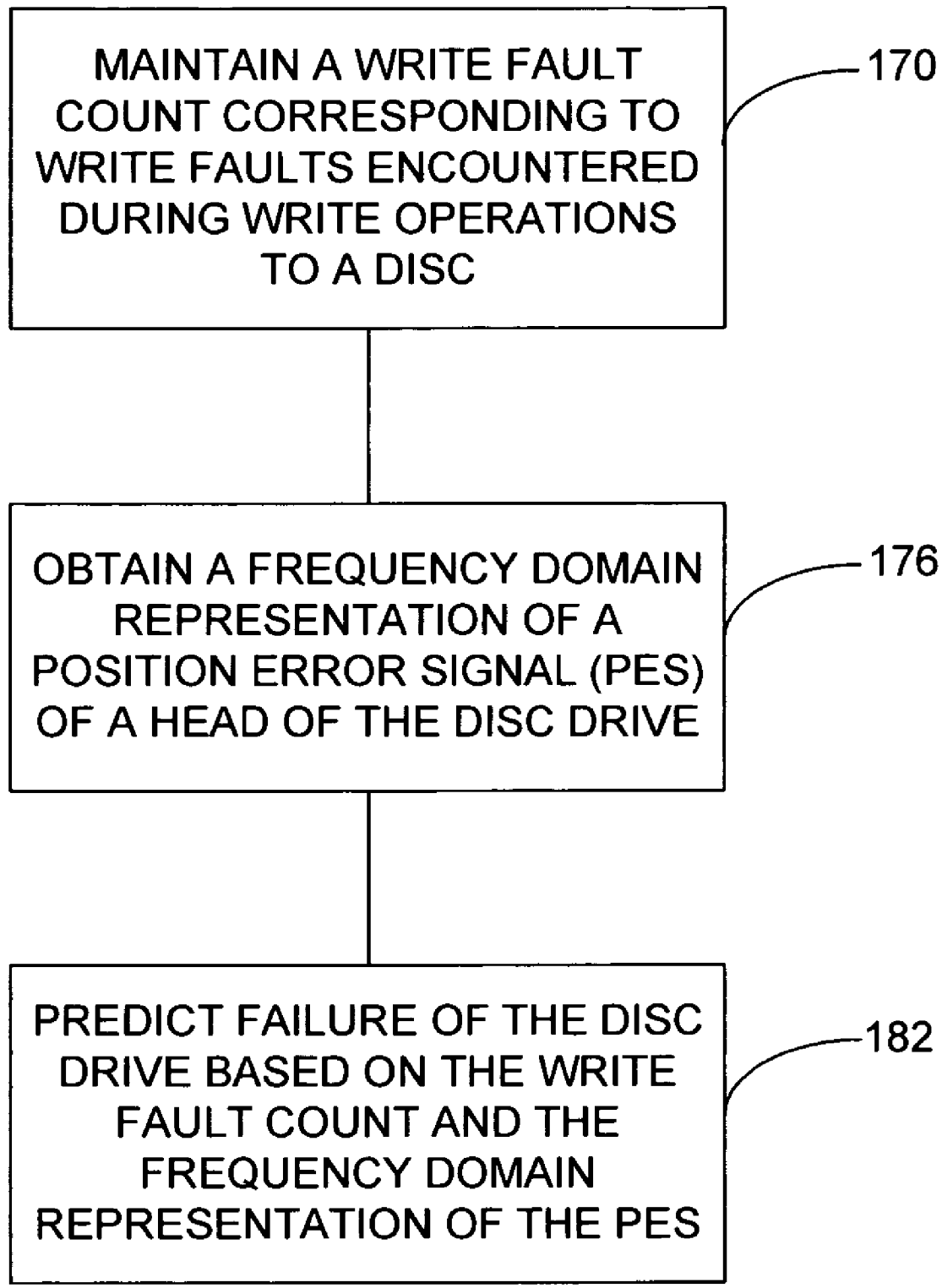
FIG. 3 is a flowchart illustrating a method of predicting failure of a disc drive in accordance with embodiments of the invention.
Figure 4:
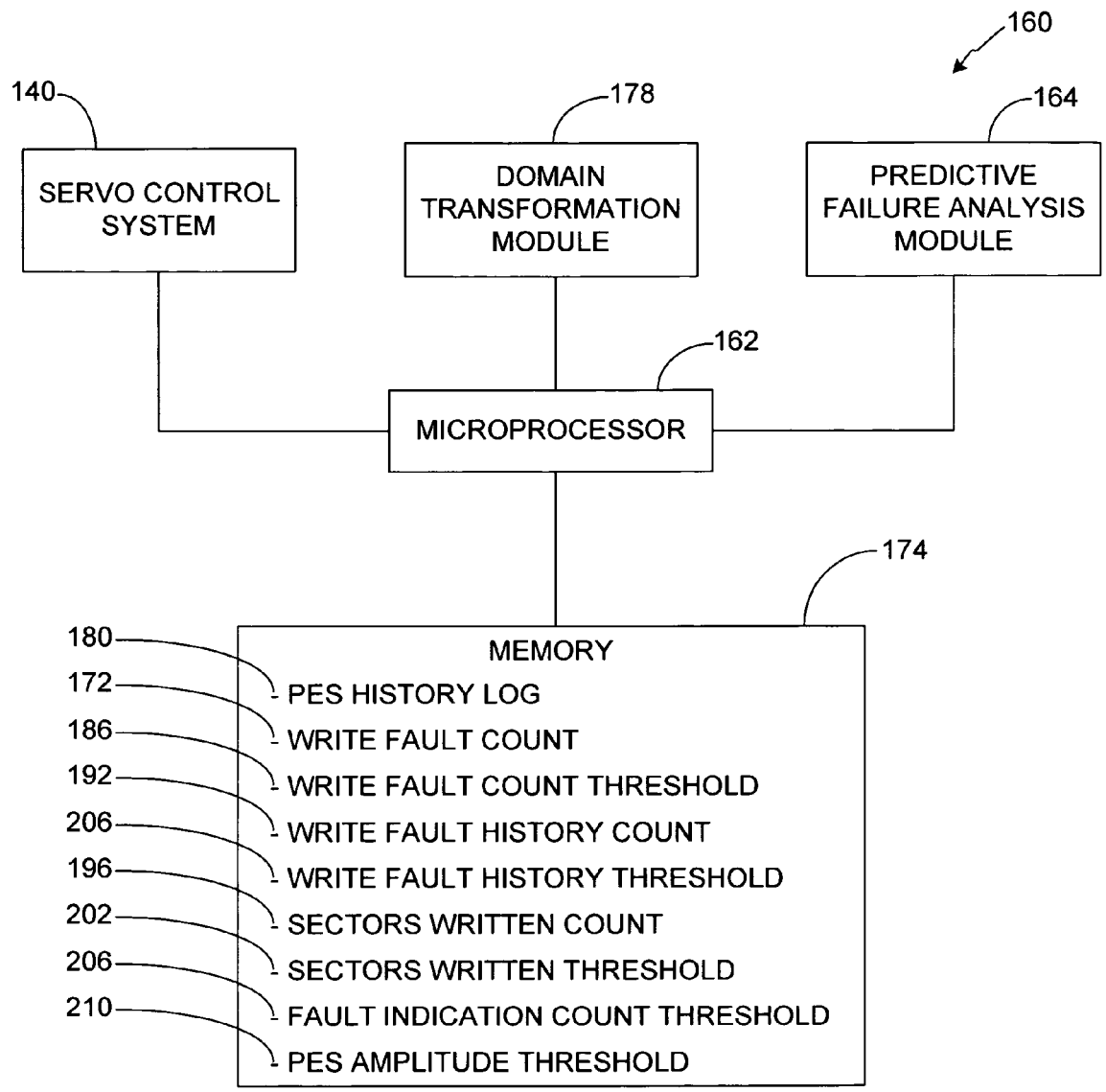
FIG. 4 is a block diagram of a disc drive in accordance with embodiments of the invention.

One embodiment of the method of the present invention is generally illustrated in the flowchart of FIG. 3. FIG. 4 is a block diagram of a disc drive 160 that includes a microprocessor 162 and a PFA module or program 164 containing instructions that are executable by the microprocessor 162 to implement the method of the present invention. The microprocessor 162 can also operate to control local disc drive operations and may serve as the controller 142 (FIG. 2) of the servo control system 140.

At step 170 of the method, a write fault count 172 is maintained in memory 174 (FIG. 4) by the microprocessor 162 in accordance with the instructions of the PFA module 164. The write fault count 172 corresponds to a count of write faults, generated by the servo control system 140, that are encountered during write operations by a head (such as head 110 of FIG. 1) to one of the discs (such as one of the discs 106 of FIG. 1). Write faults are typically encountered when the PES 156 for a head generated by the servo control system indicates that the head has moved outside the bounds of the track being written, which is also know as exceeding on cylinder limits. During such faults, the writing operation is interrupted to prevent overwriting data on adjacent tracks. The write faults, the PES, and other drive data generated by the servo control system 140 is provided to the microprocessor 162 for processing including updating the write fault count 172 in memory 174.

At step 176 of the method, a frequency domain representation of the PES 156 of the head of the disc drive is obtained by a domain transformation module 178 (FIG. 4). In accordance with one embodiment of the invention, the disc drive 160 includes a PES history log 180 in the memory 174 that maintains a history of the PES 156 (i.e., samples of the PES corresponding to a time domain representation of the PES). Preferably, the PES history log 180 includes samples of the PES 156 for at least a single revolution of the disc. However, the PES history log 180 can include more or less samples of the PES 156 depending on the resonant frequency being analyzed and the number of servo samples taken per revolution.

The domain transformation module 178 of the disc drive 160 is configured to perform a Fourier transform of the PES history log 180 to obtain the frequency domain representation of the PES, which is a measure of the energy in the PES at various frequencies. Due to the processing power and time constraints of the disc drive 160, the transformation module 178 preferably performs a discrete Fourier transform (DFT) to measure the energy in the PES at one or more predetermined frequencies that correspond to a mechanical resonance of the spindle motor that is associated with spindle motor bearing wear.

The particular frequencies that are indicative of spindle motor bearing wear (i.e., ball modes), or spindle motor failure, will vary based on the configuration of the disc drive. For example, the number of discs in the disc drive, the spindle motor design, the angular velocity at which the discs are rotated by the spindle motor, and other mechanical variables will affect the frequencies that indicate spindle motor bearing wear. In accordance with a preferred embodiment of the invention, the predetermined frequency or frequencies are in a range of 4.2-4.5 kHz.

At step 182 of the method, failure of the disc drive 160 is predicted based upon the write fault count 172 and the frequency domain representation of the PES. Preferably, a warning is provided to the user of the disc drive 160, or the system utilizing the disc drive, if disc drive failure is predicted to be imminent in step 182. The user is thereby given an opportunity to respond by taking the disc drive off-line or by taking other appropriate action to protect the data that might otherwise be lost or compromised by a disc drive failure.

Figure 5:
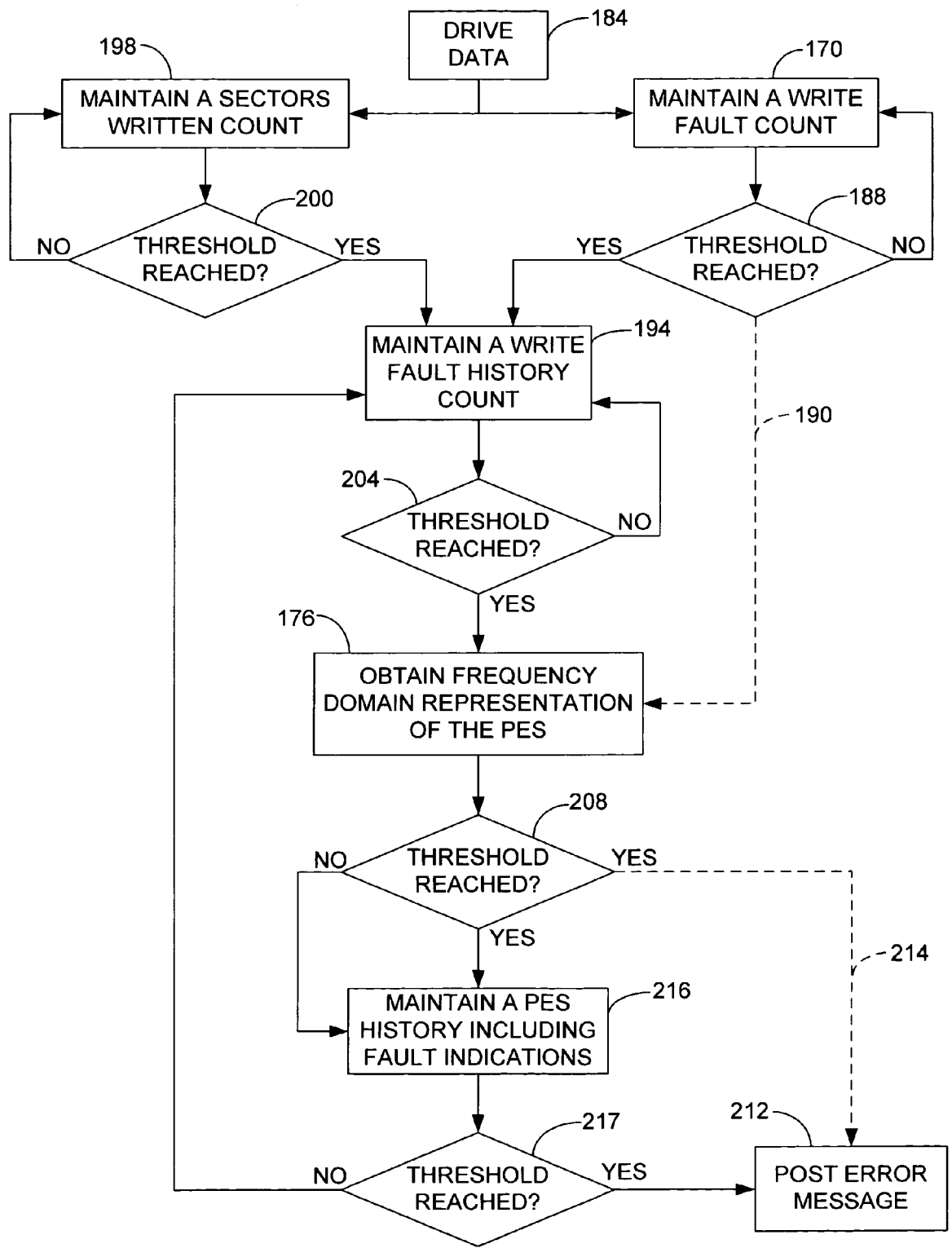
FIG. 5 is a flowchart illustrating a method of predicting failure of a disc drive in accordance with embodiments of the invention.

With reference to FIGS. 4 and 5 a more detailed discussion of embodiments of the present invention will be provided. FIG. 5 is a flowchart illustrating a method of predicting disc drive failure (i.e., PFA) of a disc drive during operation of the disc drive in accordance with embodiments of the invention. As discussed above, the steps of the method are preferably performed by the disc drive 160 (FIG. 4) in accordance with instructions contained in the PFA module 164, which are executable by the microprocessor 162.

During operation of the disc drive 160, drive data, which is represented by box 184, is continuously generated while the disc drive 160 is operating. Such drive data includes information relating to reading and writing operations including information on write faults that occur during data writing operations, information relating to the PES, information on the number of sectors written during the write operations, and other types of drive data. The drive data 184 is processed by the microprocessor 162 in accordance with instructions from the PFA module 164.

One embodiment of the method of FIG. 5 includes the step 170, in which the write fault count 172 is maintained in the manner described above. Initially the write fault count 172 in the memory 174 is set to zero or other starting value. Once the method begins, the microprocessor 162 periodically updates the write fault count 172 by incrementing the previous value in response to the detection of a write fault during data write operations.

In accordance with one embodiment of the invention, the write fault count 172 is compared to a write fault count threshold 186 stored in the memory 174, at step 188, to determine if the write fault count 172 has reached the threshold 186. Those skilled in the art understand that a threshold value can be "reached" in many different ways including matching the threshold value, exceeding the threshold value, or falling below the threshold value. To simplify the discussion of the present invention, it is assumed that the various counts described herein are incremented in response to the detection of a corresponding event and the thresholds are "reached" when the count matches or exceeds the threshold value. However, an equivalent arrangement would be to set up the counts and threshold values such that the counts are decremented toward the threshold value and the threshold values are "reached" when the counts meet or fall below the threshold values.

If the write fault count threshold 186 is not reached at step 188, the method continues maintaining the write fault count 172 in response to the drive data 184 at step 170. If the write fault count threshold 186 is reached at step 188, one embodiment of the method includes moving directly to step 176 (as indicated by the dashed branch 190), at which the frequency domain representation of the PES is obtained, as described above with regard to FIG. 3. The write fault count 172 is then preferably reset to zero or another starting value and the method continues with an analysis of the frequency domain representation of the PES, as will be described below.

Another embodiment of the invention involves maintaining a write fault history count 192 in the memory 174, as indicated at step 194 of FIG. 5. The purpose of the write fault history count 192 is to base the failure prediction (step 182 of FIG. 3) on a rate at which the write faults are encountered and to take into account evidence that indicates that the disc drive is no longer degrading at a rate that would be indicative of imminent failure. In accordance with one embodiment of the invention, the write fault history count 192 is incremented in response to the write fault count 172 reaching the write fault count threshold 186 at step 188. In accordance with one embodiment of the invention, the write fault count threshold 186 is set to a value of ten. Preferably, the write fault count 172 is reset upon reaching the write fault count threshold 186 or following the incrementing of the write fault history count 192 at step 194.

In accordance with one embodiment of the method, the write fault history count 192 is periodically decremented in response to evidence that the disc drive 160 is not facing imminent failure. In general, such evidence relates to a rate at which write faults are encountered. In accordance with one embodiment of the invention, the rate involves the number of write faults encountered over a period of time and the write fault history count is decremented when the rate drops below a predetermined threshold.

In accordance with a preferred embodiment of the invention, the rate is measured using a sectors written count 196 contained in the memory 174. The sectors written count 196 is maintained (i.e., incremented) in step 198 based on the drive data 184 for each sector written during the write operations. At step 200, the sectors written count 196 is compared to a sectors written threshold 202 contained in the memory 174. In accordance with one embodiment of the invention, the sectors written threshold 202 is set to 12207. If the sectors written count 196 reaches the sectors written threshold 202, the write fault history count 192 is preferably decremented by one or another predetermined amount. The sectors written count 196 and the write fault count 172 are then preferably reset to their start values and the counting of sectors written and write faults continues in accordance with the drive data 184. Accordingly, the write fault history count 192 is reduced, or otherwise modified to reflect a reduced likelihood of imminent disc drive failure, when the write operations fail to produce write faults at a rate that exceeds that set by the sectors written threshold 202.

At step 204 of the method, the write fault history count 192 is compared to a write fault history threshold 206 stored in the memory 174. In accordance with one embodiment of the invention, the write fault history threshold 206 is set to a value of ten. In accordance with one embodiment of the invention, if the write fault history count 192 reaches the write fault history threshold 206, the method moves on to step 176, at which the frequency domain representation of the PES is obtained. If the write fault history count 192 does not reach the write fault history threshold 206, the method continues with the maintaining of the write fault count 170, the sectors written count 198, and the write fault history count 192, as described above in response to the drive data 184.

As discussed above, embodiments of the invention include different paths to step 176 where the frequency domain representation of the PES is obtained by the domain transformation module 178. After the frequency domain representation of the PES is obtained, the method moves to step 208, at which an amplitude of the frequency domain representation of the PES at a predetermined frequency (hereinafter "PES amplitude") is compared to a PES amplitude threshold 210 stored in the memory 174. As mentioned above, the frequency domain representation of the PES at the predetermined frequency corresponds to a health of the spindle motor of the disc drive 160. The PES amplitude threshold 210 is set to a value based on empirical studies that, if reached by the PES amplitude, would indicate that the spindle motor is failing or facing imminent failure.

In accordance with one embodiment of the invention, the method moves to step 212 and the disc drive is predicted to fail when the PES amplitude threshold is reached by the PES amplitude, as indicated by the dashed branch 214. When the PES amplitude does not reach the PES amplitude threshold 210 in step 208, the method continues with the counting and comparing steps in accordance with the embodiments described above, but preferably after the write fault count 172 and the sectors written count 196 are reset to their starting values and the write fault history count 192 is decremented by one or other predetermined amount.

In accordance with another embodiment of the invention, the PES history log 180 is maintained in the memory 174 as indicated at step 216. The PES history log 180 includes the results of the most recent comparisons between the PES amplitude and the PES amplitude threshold 210 at step 208. The entries in the PES history log include a fault indication for each comparing step 208 in which the PES amplitude reaches the PES amplitude threshold 210. For example, a logic 1 in the PES history log may represent a fault indication and a logic 0 may represent when the PES amplitude failed to reach the PES amplitude threshold 210 in step 208.

In accordance with one embodiment of the invention, disc drive failure prediction (step 182 of FIG. 3) is based on a fault indication count, which corresponds to the number of fault indications in the PES history log 180. In accordance with another embodiment of the invention, the fault indication count corresponds to the number of fault indications in a predetermined number of the most recent entries in the PES history log 180. For example, the fault indication count may correspond to the fault indications in the ten most recent entries in the PES history log 180.

One embodiment of the disc drive failure prediction step 182 includes a step 217 of comparing the fault indication count to a fault indication count threshold 218 stored in the memory 174. If the fault indication count reaches the fault indication count threshold 218, the method predicts that failure of the disc drive 160 is imminent at step 217 and the method moves to step 212 where an error message is posted. For example, when the fault indication count threshold is set to seven, the method will predict imminent failure of the disc drive when the fault indication count reaches seven.

If the fault indication count does not reach the fault indication count threshold 218 at step 217, the method continues performing the counting and comparing steps in accordance with the embodiments described above. Additionally, the write fault count 172 and the sectors written count 196 may be reset to their starting values if desired. In accordance with one embodiment of the invention, the write fault history count 192 is decremented one or other predetermined amount when the fault indication count does not reach the fault indication count threshold 218 at step 217.

The embodiments of the disc drive failure prediction method and the disc drive configured to implement the method described above target disc drives with degraded spindle motors. By basing the disc drive failure prediction on at least two disc drive attributes—the write fault count and the frequency domain representation of the PES—false disc drive failure predictions are reduced as compared to methods that predict disc drive failure based on a single disc drive attribute.

As mentioned above, the spindle motor of the disc drive rotates one or more discs. Over time, bearings of the spindle motor contained in raceways wear and eventually produce a vibration or mechanical resonance during the rotation of the discs that can result in disc drive errors such as data writing errors or write faults. Although the existence of write faults, or a high rate of write faults, can be indicative of an imminent disc drive failure, it has been found that relying solely on the existence of such a single disc drive attribute results in a high percentage of false disc drive failure predictions. The method of the present invention reduces false disc drive failure predictions by basing a disc drive failure prediction on at least two attributes in combination. These attributes include a write fault count and a frequency domain representation of a position error signal (PES) of a head of the disc drive, both of which relate to disc drive failure caused by spindle motor degradation.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the mechanical components of the disc drive that are being monitored for failure. Thus, the frequency domain representation of the PES may be analyzed at a predetermined frequency that is indicative of a worn mechanical component other than a spindle motor, such as an actuator, a suspension, or other mechanical component of the disc drive. In addition, although the preferred embodiment described herein is directed to a magnetic disc drive storage system, it will be appreciated by those skilled in the art that the teachings of the present invention can be applied to optical disc drive systems, without departing from the scope and spirit of the present invention.

What is claimed is:

1. A method of predicting failure of a disc drive during operation of the disc drive comprising steps of:
    maintaining a write fault count corresponding to write faults encountered during write operations to a disc;
    comparing the write fault count to a write fault count threshold;
    incrementing a write fault history count when the write fault count reaches the write fault count threshold;
    obtaining a frequency domain representation of a position error signal (PES) of a head of the disc drive; and predicting failure of the disc drive based on the write fault history count and the frequency domain representation of the PES.

2. The method of claim 1 including
comparing a PES amplitude of the frequency domain representation of the PES at a predetermined frequency to a PES amplitude threshold,
wherein the predicting step includes predicting failure of the disc drive based on the step of comparing the PES amplitude of the frequency domain representation of the PES at a predetermined frequency to the PES amplitude threshold.

3. The method of claim 2, wherein:
the method includes comparing the write fault history count to a write fault history threshold; and
the predicting step includes predicting failure of the disc drive based on the comparison of the write fault history count to the write fault history threshold.

4. The method of claim 3, further comprising decrementing the write fault history count in response to evidence that the disc drive is not facing imminent failure.

5. The method of claim 4, wherein the evidence comprises a count of sectors written during the write operation.

6. The method of claim 5 including:
maintaining a sectors written count corresponding to a number of sectors of data written during the write operation;
comparing the sectors written count to a sectors written threshold; and
decrementing the write fault history count when the sectors written count reaches the sectors written threshold.

7. The method of claim 2, further comprising incrementing a fault indication count when the PES amplitude of the frequency domain representation of the PES reaches a PES threshold amplitude; wherein the predicting step includes predicting failure of the disc drive based on the fault indication count.

8. The method of claim 7, wherein the predicting step includes predicting failure of the disc drive when the fault indication count reaches a fault indication count threshold, which is greater than 1.

9. The method of claim 8, wherein the fault indication count is limited to a predetermined number of most recent comparisons of the PES amplitude of the frequency domain representation of the PES to the PES amplitude threshold.

10. The method of claim 1, wherein the obtaining step includes running a discrete Fourier transform of the PES signal for a single revolution of the disc.

11. The method of claim 2, wherein the predetermined frequency corresponds to a mechanical resonance of a spindle motor of the disc drive.

12. A disc drive configured to perform predictive failure analysis comprising:
a microprocessor;
a memory accessible by the microprocessor including a write fault count, a write fault count threshold and a write fault history count; and
a failure analysis module including instructions executable by the microprocessor to perform steps of:
maintaining the write fault count corresponding to write faults encountered during write operations to a disc;
incrementing the write fault history count when the write fault count reaches the write fault count threshold;
obtaining a frequency domain representation of a position error signal (PES) of a head of the disc drive; and
predicting failure of the disc drive based on the frequency domain representation of the PES and the write fault history count.

13. The disc drive of claim 12, wherein:
the memory includes a position error signal (PES) amplitude threshold; and
the failure analysis module includes instructions executed by the microprocessor to further perform a step of
comparing a PES amplitude of the frequency domain representation of the PES at a predetermined frequency to the PES amplitude threshold,
wherein the predicting step includes predicting failure of the disc drive based on the comparing steps.

14. The disc drive of claim 13, wherein:
the memory includes a write fault history threshold; and
the failure analysis module includes instructions executed by the microprocessor to perform steps of:
comparing the write fault history count to the write fault history threshold; and
predicting failure of the disc drive based on the comparison of the write fault history count to the write fault history threshold.

15. The disc drive of claim 14, wherein the failure analysis module includes instructions executable by the microprocessor to perform a step of decrementing the write fault history count in response to evidence that the disc drive is not facing imminent failure.

16. The disc drive of claim 15, wherein the evidence comprises a count of sectors written during the write operations.

17. The disc drive of claim 12 wherein:
the memory includes a PES history log having a fault indication count corresponding to when the amplitude of the frequency domain representation of the PES reaches the PES amplitude threshold; and
the failure analysis module includes instructions executed by the microprocessor to further perform a step of incrementing a fault indication count when a PES amplitude of the frequency domain representation of the PES reaches a PES threshold amplitude, wherein the predicting step includes predicting failure of the disc drive when the fault indication count reaches a fault indication count threshold.

18. A method of predicting failure of a disc drive during operation of the disc drive comprising steps of:
a) maintaining a write fault count corresponding to write faults encountered during write operations to a disc;
b) comparing the write fault count to a write fault count threshold;
c) incrementing a write fault history count when the write fault count reaches the write fault count threshold in the comparing step b);
d) comparing the write fault history count to a write fault history threshold; and
e) obtaining a frequency domain representation of a position error signal (PES) of a head of the disc drive;
f) comparing a PES amplitude of the frequency domain representation of the PES at a predetermined frequency to a PES amplitude threshold; and
g) predicting failure of the disc drive based on the comparing steps d) and f).

19. The method of claim 18, wherein the predicting step g) includes:

maintaining a PES history log of the comparing step f) including a fault indication count corresponding to when the amplitude of the frequency domain representation of the PES reaches the PES amplitude threshold; and predicting failure of the disc drive when the fault indication count reaches a fault indication count threshold.

20. The method of claim 18, further comprising decrementing the write fault history count in response to evidence that the disc drive is not facing imminent failure.

* * * * *